(12) United States Patent
Zhang et al.

(10) Patent No.: US 11,787,381 B1
(45) Date of Patent: Oct. 17, 2023

(54) TEMPERATURE MONITORING METHOD OF BRAKE OF FREIGHT VEHICLE BASED ON TBOX

(71) Applicant: Research Institute of Highway Ministry of Transport, Beijing (CN)

(72) Inventors: Lu Zhang, Beijing (CN); Wei Zhou, Beijing (CN); Wenliang Li, Beijing (CN); Chen Li, Beijing (CN); Jie Jin, Beijing (CN); Xuewen Zhang, Beijing (CN)

(73) Assignee: RESEARCH INSTITUTE OF HIGHWAY MINISTRY OF TRANSPORT, Beijing (CN)

( * ) Notice: Subject to any disclaimer, the term of this patent is extended or adjusted under 35 U.S.C. 154(b) by 0 days.

(21) Appl. No.: 18/118,123

(22) Filed: Mar. 6, 2023

(30) Foreign Application Priority Data

May 7, 2022 (CN) .......................... 202210496058.4

(51) Int. Cl.
*B60T 17/22* (2006.01)
(52) U.S. Cl.
CPC ........... *B60T 17/22* (2013.01); *B60T 2210/36* (2013.01); *B60T 2250/02* (2013.01)
(58) Field of Classification Search
CPC ........ B60T 17/18; B60T 17/221; B60T 17/22; B60T 2210/36; B60T 2250/02;
(Continued)

(56) References Cited

U.S. PATENT DOCUMENTS 9,086,948 B1 * 7/2015 Slusar ................... G06Q 40/08
9,682,624 B1 * 6/2017 Koebler ............. G01C 21/3617
(Continued)

FOREIGN PATENT DOCUMENTS

CN 109606329 A * 4/2019
CN 112550262 A * 3/2021
(Continued)

OTHER PUBLICATIONS

Search Report for application CN 2022104960584. dated Oct. 25, 2022. China National Intellectual Property Administration (CNIPA). (Year: 2022).*
(Continued)

*Primary Examiner* — Nicholas J Lane
*Assistant Examiner* — Stephen M Bowes

(57) ABSTRACT

A temperature monitoring method of a brake of a freight vehicle based on TBOX is provided, including: determining a weight of the freight vehicle based on OBD data of the freight vehicle collected by the TBOX; inputting the weight, the OBD data, a longitudinal slope in a high-precision map to determine the temperature of the brake of the freight vehicle; setting a temperature warning threshold of the brake based on its performance parameters of the freight vehicle, and determining a first driving state and a second driving state in a front road section with the determined temperature of the brake, and generating a warning signal and a fore-warning signal of the freight vehicle. The monitoring method improves accuracy of the brake temperature by introducing altitude variation of the front road section and weight of the freight vehicle, and provides powerful data support for a safe driving.

7 Claims, 2 Drawing Sheets

(58) Field of Classification Search
CPC ...... B60T 8/1708; B60T 8/1887; B60T 8/245; B60T 8/323; B60W 2050/143; B60W 2050/146; B60W 2510/184; B60W 2530/10; B60W 2552/25; B60W 2555/40; B60W 2710/184; B60W 30/184; B60W 50/14; B60W 50/16; F16D 2066/001; F16D 2066/006; F16D 66/00
See application file for complete search history.

(56) References Cited

U.S. PATENT DOCUMENTS

| | | | | |
|---|---|---|---|---|
| 2008/0236269 | A1* | 10/2008 | Howell | B60T 17/221 73/121 |
| 2016/0138665 | A1* | 5/2016 | Antanaitis | B60T 17/22 701/70 |
| 2017/0297573 | A1* | 10/2017 | Fraser | B60W 30/143 |
| 2019/0017561 | A1* | 1/2019 | Antanaitis | B60T 17/221 |
| 2019/0071062 | A1* | 3/2019 | Robere | B60L 3/12 |
| 2019/0084548 | A1* | 3/2019 | Ohazulike | F16D 66/00 |
| 2019/0107163 | A1* | 4/2019 | Medinei | F16D 66/026 |
| 2019/0308598 | A1* | 10/2019 | Son | B60T 17/221 |
| 2020/0102993 | A1* | 4/2020 | Antanaitis | B60T 17/22 |
| 2020/0232531 | A1* | 7/2020 | Robere | F16D 66/00 |
| 2022/0176826 | A1* | 6/2022 | Cho | B60L 7/26 |

FOREIGN PATENT DOCUMENTS

| | | | |
|---|---|---|---|
| CN | 112926140 | A * | 6/2021 |
| DE | 102017011807 | A1 * | 6/2019 |
| JP | 2019190537 | A * | 10/2019 |

OTHER PUBLICATIONS

CNIPA, Notification of a First Office Action for CN202210496058.4, dated Nov. 1, 2022.
Research Institute of Highway Ministry of Transport (Applicant), Reply to Notification of a First Office Action for CN202210496058.4, w/ replacement claims, dated Nov. 1, 2022.
Research Institute of Highway Ministry of Transport (Applicant), Supplemental Reply to Notification of a First Office Action for CN202210496058.4, w/ (allowed) replacement claims.
CNIPA, Notification to grant patent right for invention in CN202210496058.4, dated Nov. 23, 2022.

* cited by examiner

TEMPERATURE MONITORING METHOD OF BRAKE OF FREIGHT VEHICLE BASED ON TBOX

TECHNICAL FIELD

The disclosure relates to the technical field of temperature monitoring of a brake of a freight vehicle, in particular to a temperature monitoring method of a brake of a freight vehicle based on a telematics BOX (TBOX).

BACKGROUND

A whole weight of a freight vehicle (especially a heavy vehicle) changes greatly according to different transport requirements (there is a large gap in the weights of the freight vehicle being empty and the freight vehicle being fully loaded). Therefore, it is a critical test for braking performance of the freight vehicle in some long downhill road sections, and it is a common phenomenon that accidents are occurred due to a failure of the brake of the freight vehicle in the long downhill road sections. One of the most critical parameters to characterize the braking performance of the freight vehicle is the temperature of the brake. Therefore, it is of practical significance to carry out a study of the temperature monitoring of the brake of the freight vehicle.

With a development of intelligent freight vehicles, a telematics BOX (TBOX) is popularly installed in the freight vehicle, which can deeply read Controller Area Network (CAN) data and private protocols of the freight vehicles. TBOX collects the CAN data of the freight vehicle through an on-board diagnostic (OBD) module and microcontroller unit (MCU). In addition, TBOX has achieved embedding a map with higher precision, which can not only obtain position information of the freight vehicle, but also provide longitudinal slope information of a current road, as well as longitudinal slope information of a front road section. By applying the TBOX to collect the above information in a real-time, it is possible to determine a weight of the freight vehicle by combining a theoretical model and parameters related to the freight vehicle on the one hand, and on the other hand, it is also possible to monitor the temperature of the brake of the freight vehicle by establishing a temperature model of the brake of the freight vehicle during a braking process in combination with the determined weight of the freight vehicle. There is no existing technical solution for temperature monitoring of the brake of the freight vehicle from the data collected by the TBOX. Therefore, there is an urgent need for a temperature monitoring method of a brake of a freight vehicle, which can ensure safe driving of the freight vehicle by monitoring the temperature of the brake after collecting the CAN data of the freight vehicle by the TBOX.

SUMMARY

To solve the above problems, an objective of the disclosure is to provide a temperature monitoring method of a brake of a freight vehicle based on a telematics BOX (TBOX), which monitors the temperature of the brake of the freight vehicle and predicts safety of the freight vehicle on a road according to an obtained weight of the freight vehicle, position information of the freight vehicle and information of the road.

To achieve the above objective, the disclosure provides the temperature monitoring method of the brake of the freight vehicle based on the TBOX:

determining a weight of the freight vehicle based on on-board diagnostic (OBD) data of the freight vehicle collected by the TBOX;

collecting an altitude of the freight vehicle and an altitude variation of a front road section, and determining a current temperature of the brake of the freight vehicle based on the weight of the freight vehicle, the OBD data of the freight vehicle, the altitude of the freight vehicle and the altitude variation of the front road section; and setting a temperature warning threshold of the brake based on performance parameters of the brake of the freight vehicle, and determining a first driving state of the freight vehicle and a second driving state of the freight vehicle in the front road section based on the temperature warning threshold and the current temperature of the brake.

The first driving state indicates a driving state of the freight vehicle corresponding to the current temperature of the brake, and is configured to generate a warning signal of the freight vehicle.

The second driving state indicates a driving state of the freight vehicle corresponding to a braking result of the freight vehicle caused by a temperature variation of the brake in the front road section, and is configured to generate a forewarning signal of the freight vehicle.

In an illustrated embodiment of the disclosure, the determining the current temperature of the brake of the freight vehicle based on the weight of the freight vehicle, the OBD data of the freight vehicle, the altitude of the freight vehicle and the altitude variation of the front road section includes:

determining a heat increasing amount, a friction-generated heat amount of the brake, a convection heat dissipation amount and a radiation heat dissipation amount in a heat dissipation process of the brake to generate the current temperature of the brake.

The heat increasing amount is determined based on the following formula:

$$\Delta Q = Q_1 - Q_2 - Q_3,$$

wnere $Q_1$ represents the friction-generated heat amount of the brake, $Q_2$ represents the convection heat dissipation amount, and $Q_3$ represents the radiation heat dissipation amount.

The friction-generated heat amount of the brake is determined based on the following formula:

$$Q_1(t) = \left\{\frac{1}{2}mv_0^2 - \frac{1}{2}mv(t)^2 + \int_{t_0}^{t} mgv(t) \times (i(t) - f) dt\right\} \times (1 - s(t)),$$

where in represents the weight of the freight vehicle, $v_0$ represents a speed of the freight vehicle at a moment $t_0$, $v(t)$ represents a speed of the freight vehicle at a moment t, g represents a gravitational acceleration, $i(t)$ represents a longitudinal slope of a road section at the moment t, f represents a rolling resistance coefficient of the freight vehicle, and $s(t)$ represents a slip rate of wheels of the freight vehicle at the moment t during a braking process of the freight vehicle.

The convection heat dissipation amount is determined based on the following formula:

$$Q_2(t) = h(t)A(T_w(t) - T_f(t)),$$

where h(t) represents a convective heat transfer coefficient and is determined based on a relevant empirical formula as follows:

$$h(t) = 1.05e^{v(t)/14.19} + 4.69.$$

The radiation heat dissipation amount is determined based on the following formula:

$$Q_3(t) = \frac{1}{4}Q_2(t).$$

A theoretical temperature variation T(t) of the brake is determined based on the following formula:

$$T(t) = T_0 + \frac{\Delta Q}{Cm_a} = T_0 + \frac{Q_1 - Q_2 - Q_3}{Cm_a},$$

where C represents a specific heat capacity and a value of C is 470 Joules per kilogram degree Celsius (J/(kg·° C.)), and $m_a$ represents a mass of a brake disc or a brake drum of the freight vehicle.

In an illustrated embodiment of the disclosure, in a process of obtaining kinetic energy of the freight vehicle, the weight of the freight vehicle is expressed as:

$$m(\delta a_x + a_\beta + f_m g) + \frac{1}{2}\rho C_d A_f v_x^2 = \frac{T_e n_e \eta_T}{v_x},$$

where δ represents a rotational mass coefficient of the freight vehicle and a value of h is an empirical value, $a_x$ represents a longitudinal acceleration of the freight vehicle, $a_\beta$ represents an equivalent acceleration value converted by a gradient resistance, β represents a slope of the front road section, $f_m$ represents the rolling resistance coefficient of the freight vehicle, g represents the gravitational acceleration, ρ represents an air density, $C_d$ represents a wind resistance coefficient, $A_f$ represents a windward area, $v_x$ represents a longitudinal speed of the freight vehicle, $T_e$ represents an output torque of a motor of the freight vehicle, $n_e$ represents a rotation speed of the motor of the freight vehicle, and $\eta_T$ represents a mechanical efficiency of a power transmission system of the freight vehicle.

In an illustrated embodiment of the disclosure, the determining the first driving state of the freight vehicle based on the temperature warning threshold and the current temperature of the brake includes: determining the current temperature of the brake based on a work done by a friction of the brake of the freight vehicle, determining a temperature variation trend of the brake according to a driving route trend of the freight vehicle, and generating the first driving state according to the current temperature of the brake, the temperature variation trend, and the temperature warning threshold.

In an illustrated embodiment of the disclosure, the determining the second driving state of the freight vehicle based on the temperature warning threshold and the current temperature of the brake includes: determining the altitude variation in the front road section and a driving trajectory variation of the freight vehicle based on a satellite navigation map; and determining, based on the altitude variation and the current temperature of the brake, the second driving state in the front road section in a case that the freight vehicle remains in the first driving state.

In an illustrated embodiment of the disclosure, during the determining the second driving state of the freight vehicle based on the temperature warning threshold and the current temperature of the brake, the temperature monitoring method further includes: determining a third driving state of the freight vehicle in the front road section according to the first driving state, the driving trajectory variation of the freight vehicle and the altitude variation of the front road section. The third driving state indicates a safe temperature of the brake under the altitude variation in the front road section and the driving trajectory variation of the freight vehicle; and the first driving state of the freight vehicle is adjusted according to the third driving state.

In an illustrated embodiment of the disclosure, a monitoring system for implementing the temperature monitoring method includes:
  a freight vehicle weight determination module, used to determine the weight of the freight vehicle based on the OBD data of the freight vehicle collected by the TBOX;
  a brake temperature determination module, used to collect the altitude of the freight vehicle and the altitude variation in the front road section, and to determine the current temperature of the brake of the freight vehicle based on the weight of the freight vehicle, the OBD data of the freight vehicle, the altitude of the freight vehicle and the altitude variation of the front road section; and
  a freight vehicle monitoring module, used to set the temperature warning threshold of the brake based on the performance parameters of the brake of the freight vehicle, and to determine the first driving state of the freight vehicle and the second driving state of the freight vehicle in the front road section based on the temperature warning threshold and the current temperature of the brake.

The first driving state indicates the driving state of the freight vehicle corresponding to the current temperature of the brake, and is used to generate the warning signal of the freight vehicle.

The second driving state indicates the driving state of the freight vehicle corresponding to the braking result of the freight vehicle caused by the temperature variation of the brake in the front road section, and is used to generate the forewarning signal of the freight vehicle.

In an illustrated embodiment of the disclosure, the monitoring system further includes: a data collecting module, which is used to connect to the TBOX, and a display module, which is used to display the first driving state, the second driving state, the third driving state, the warning signal, and the forewarning signal.

The disclosure has at least advantages as follows.

The disclosure introduces the altitude variation of the front road section and the determination of the weight of the freight vehicle during monitoring the temperature of the brake of the freight vehicle, which greatly improves accuracy of the monitored temperature of the brake of the freight vehicle and provides powerful data support for the safe driving of the freight vehicle.

BRIEF DESCRIPTION OF DRAWINGS

In order to more clearly illustrate technical solutions of embodiments of the disclosure or in the related art, the following briefly describes attached drawings to be used in the embodiments. Apparently, the following descriptions of the attached drawings are merely some embodiments of the disclosure, for those skilled in the related art, other drawings can be obtained according to the attached drawings without paying creative labor.

DETAILED DESCRIPTION OF THE EMBODIMENTS

In order to make the objective, technical solutions and advantages of the embodiments of the disclosure clearer, the technical solutions in the embodiments of the disclosure will be clearly and completely described below in combination with the attached drawings in the embodiments of the disclosure, and it is clear that the embodiments described are merely parts of the embodiments of the disclosure, and not all of them. The components of the embodiments of the disclosure generally described and illustrated in the attached drawings herein may be arranged and designed in a variety of different configurations. Accordingly, the following detailed descriptions of the embodiments of the disclosure provided in the attached drawings are not intended to limit the scope of the protection of the disclosure, but merely indicate the illustrated embodiments of the disclosure. Based on the embodiments of the disclosure, all other embodiments obtained without creative labor by those skilled in the related art fall within the scope of the protection of the disclosure.

Figure 1:
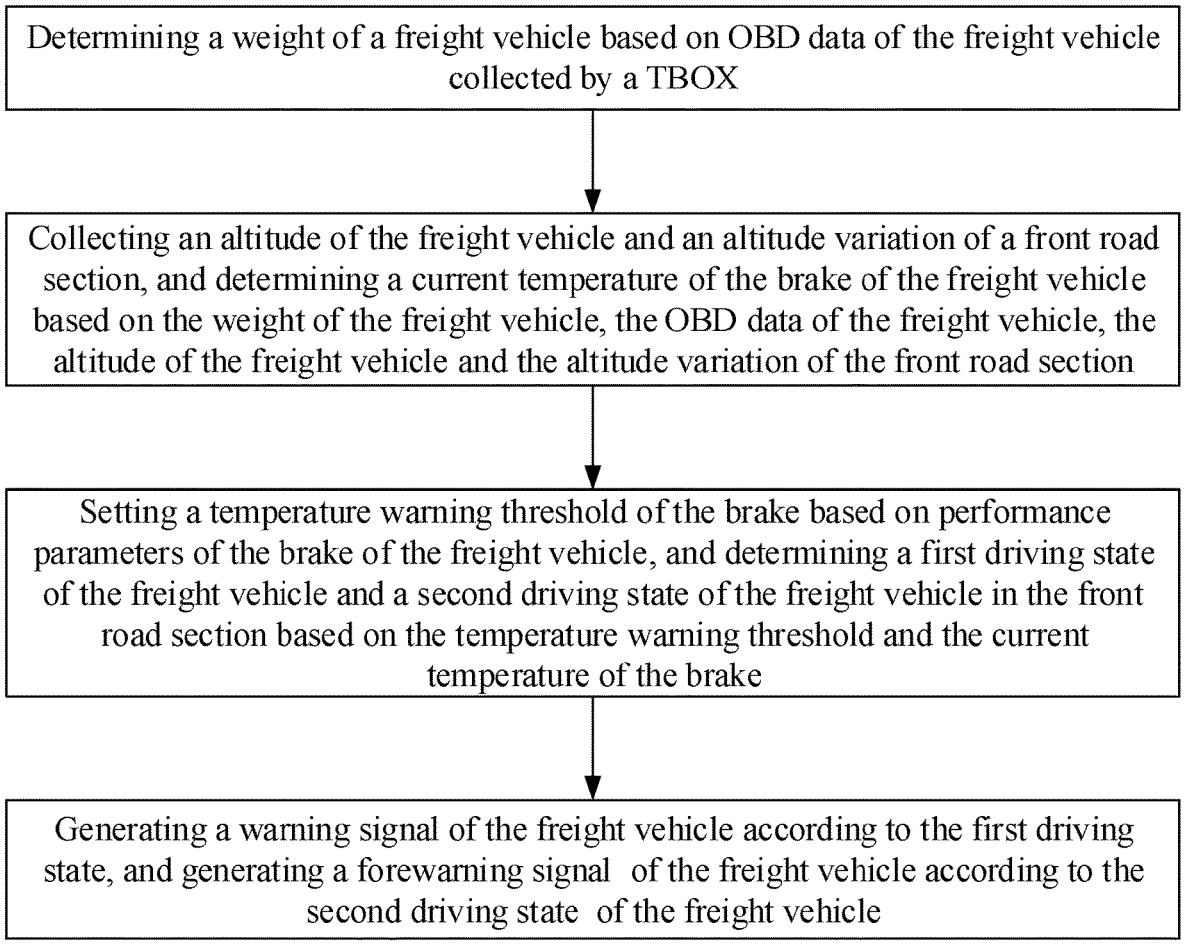
FIG. 1 illustrates a schematic diagram of steps of a temperature monitoring method according to an embodiment of the disclosure.
Figure 2:
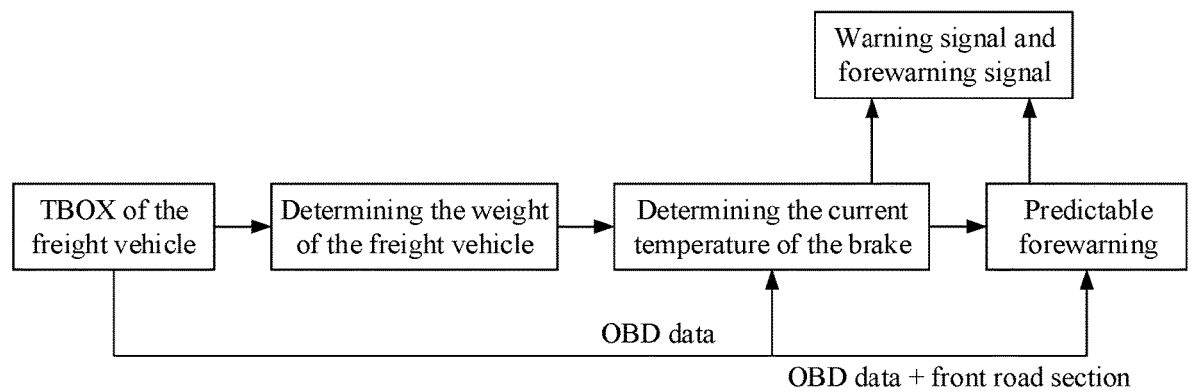
FIG. 2 illustrates a flow diagram of the temperature monitoring method according to the embodiment of the disclosure.

Referring to FIGS. 1-2, the disclosure provides a temperature monitoring method of a brake of a freight vehicle based on a telematics BOX (TBOX), including:
- determining a weight of the freight vehicle based on on-board diagnostic (OBD) data of the freight vehicle collected by the TBOX;
- collecting an altitude of the freight vehicle and an altitude variation of a front road section, and determining a current temperature of the brake of the freight vehicle based on the weight of the freight vehicle, the OBD data of the freight vehicle, the altitude of the freight vehicle and the altitude variation of the front road section; and
- setting a temperature warning threshold of the brake based on performance parameters of the brake of the freight vehicle, and determining a first driving state of the freight vehicle and a second driving state of the freight vehicle in the front road section based on the temperature warning threshold and the current temperature of the brake.

The first driving state indicates a driving state of the freight vehicle corresponding to the current temperature of the brake, and is used to generate a warning signal of the freight vehicle.

The second driving state indicates a driving state of the freight vehicle corresponding to a braking result of the freight vehicle caused by a temperature variation of the brake in the front road section, and is used to generate a forewarning signal of the freight vehicle.

In an illustrated embodiment of the disclosure, there are three basic heat transfer methods in terms of the thermodynamic transfer mechanism, namely heat conduction, heat convection and heat radiation, which exist simultaneously in a heat dissipation process of the brake.

According to theoretical analysis and experience, a proportion of the heat conduction is little, so it can be ignored in the calculation.

A heat increasing amount is determined based on the following formula:

$$\Delta Q = Q_1 - Q_2 - Q_3,$$

where $Q_1$ represents a friction-generated heat amount of the brake, $Q_2$ represents a convection heat dissipation amount, and $Q_3$ represents a radiation heat dissipation amount.

The friction-generated heat amount is calculated through the following manner.

Specifically, during the braking process of the freight vehicle, the kinetic energy of the freight vehicle is reduced with a decrease of driving speed, and the reduced energy is converted into the friction-generated heat of the brake. If the freight vehicle is driven on a road with a longitudinal slope, a variation in gravitational potential energy of the freight vehicle should be considered. At the same time, when wheels are in a state close to clamping, there will be a certain slip rate of the wheels, which should also be considered. Therefore, when a part of the reduced energy is converted into the friction-generated heat between the tires and the road. Combining the above analysis, it is deduced that the friction-generated head amount of the brake of the freight vehicle during the baking process is determined based on the following formula:

$$Q_1(t) = \left\{\frac{1}{2}mv_0^2 - \frac{1}{2}mv(t)^2 + \int_{t_0}^{t} mgv(t) \times (i(t) - f)dt\right\} \times (1 - s(t)), \quad (1)$$

where m represents the weight of the freight vehicle, $v_0$ represents a speed of the freight vehicle at a moment $t_0$, $v(t)$ represents a speed of the freight vehicle at a moment t, g represents a gravitational acceleration, i(t) represents a longitudinal slope of a road section at the moment t, f represents a rolling resistance coefficient of the freight vehicle, and s(t) represents a slip rate of wheels of the freight vehicle at the moment t during a braking process of the freight vehicle.

The convection heat dissipation amount is calculated through the following manner.

Specifically, the convection heat dissipation amount is determined based on the following formula:

$$Q_2(t) = h(t)A(T_w(t) - T_f(t)), \quad (2)$$

where A represents a surface area of the brake in direct contact with air, h(t) represents a convective heat transfer coefficient, $T_w(t)$ represents a temperature of a brake outer surface, and $T_f(t)$ represents a temperature of brake outer swept fluid.

The convective heat transfer coefficient is determined based on a relevant empirical formula as follows:

$$h(t) = 1.05e^{v(t)/14.19} + 4.69.$$

The radiation heat dissipation amount is calculated through the following manner.

Specifically, the convection heat dissipation amount accounts for about 80% of the total heat dissipation, therefore, the radiation heat dissipation is carried out according to a relationship with the convection heat dissipation amount, which is determined based on the following formula:

$$Q_3(t) = \frac{1}{4}Q_2(t). \quad (3)$$

According to thermodynamic theory, it is known that a theoretical temperature variation T(t) of the brake is determined based on the following formula:

$$T(t) = T_0 + \frac{\Delta Q}{Cm_a} = T_0 + \frac{Q_1 - Q_2 - Q_3}{Cm_a},$$

where C represents a specific heat capacity and a value of C is 470 Joules per kilogram degree Celsius (J/(kg·° C.)), and $m_a$ represents a mass of a brake disc or a brake drum of the freight vehicle.

In an illustrated embodiment of the disclosure, during obtaining the kinetic energy of the freight vehicle, the weight of the freight vehicle is expressed as:

$$m(\delta a_x + a_\beta + f_m g) + \frac{1}{2}\rho C_d A_f v_x^2 = \frac{T_e n_e \eta_T}{v_x}, \quad (4)$$

where δ represents a rotational mass coefficient of the freight vehicle and a value of δ is an empirical value, $a_x$ represents a longitudinal acceleration of the freight vehicle, $a_\beta$ represents an equivalent acceleration value converted by a gradient resistance, β represents a slope of the front road section, $f_m$ represents the rolling resistance coefficient of the freight vehicle, g represents the gravitational acceleration, ρ represents an air density, $C_d$ represents a wind resistance coefficient, $A_f$ represents a windward area; $v_x$ represents a longitudinal speed of the freight vehicle, $T_e$ represents an output torque of a motor of the freight vehicle; $n_e$ represents a rotation speed of the motor of the freight vehicle, and $\eta_T$ represents a mechanical efficiency of a power transmission system of the freight vehicle.

In an illustrated embodiment of the disclosure, during the determining the first driving state of the freight vehicle based on the temperature warning threshold and the current temperature of the brake, the current temperature of the brake is determined based on a work done by a friction of the brake of the freight vehicle; a temperature variation trend of the brake is determined according to a driving route trend of the freight vehicle, and the first driving state is generated according to the current temperature of the brake, the temperature variation trend, and the temperature warning threshold.

In an illustrated embodiment of the disclosure, the determining the second driving state of the freight vehicle based on the temperature warning threshold and the current temperature of the brake includes: determining the altitude variation of the front road section and a driving trajectory variation of the freight vehicle based on a satellite navigation map; and determining, based on the altitude variation of the front road section and the current temperature of the brake, the second driving state in the front road section in a case that the freight vehicle remains in the first driving state.

In an illustrated embodiment of the disclosure, during the determining the second driving state of the freight vehicle based on the temperature warning threshold and the current temperature of the brake, the temperature monitoring method further includes: determining a third driving state of the freight vehicle in the front road section according to the first driving state, the driving trajectory variation of the freight vehicle and the altitude variation of the front road section, where the third driving state indicates a safe temperature of the brake under the altitude variation of the front road section and the driving trajectory variation of the freight vehicle; and adjusting the first driving state of the freight vehicle according to the third driving state of the freight vehicle.

In an illustrated embodiment of the disclosure, the temperature monitoring method is implemented by a monitoring system, and the monitoring system includes:
a freight vehicle weight determination module, used to determine the weight of the freight vehicle based on the OBD data of the freight vehicle collected by the TBOX;
a brake temperature determination module, used to collect the altitude of the freight vehicle and the altitude variation of the front road section, and to determine the current temperature of the brake of the freight vehicle based on the weight of the freight vehicle, the OBD data of the freight vehicle, the altitude of the freight vehicle and the altitude variation of the front road section; and
a freight vehicle monitoring module, used to set the temperature warning threshold of the brake based on the performance parameters of the brake of the freight vehicle, and to determine the first driving state of the freight vehicle and the second driving state of the freight vehicle in the front road section based on the temperature warning threshold and the current temperature of the brake.

The first driving state indicates the driving state of the freight vehicle corresponding to the current temperature of the brake, and is used to generate the warning signal of the freight vehicle.

The second driving state indicates the driving state of the freight vehicle corresponding to the braking result of the freight vehicle caused by the temperature variation of the brake in the front road section, and is used to generate the forewarning signal of the freight vehicle.

In an illustrated embodiment of the disclosure, the monitoring system further includes: a data acquisition module, which is used to connect to the telematics BOX; and a display module, which is used to display the first driving state, the second driving state, the third driving state, the warning signal, and the forewarning signal.

One of functions of the brake mentioned in the disclosure is to store and dissipate the heat generated by the friction, and integrity of the brake is directly related to its temperature. Emergency braking requires a rapid increase in an area of the friction to reduce the temperature of the brake. While continuous braking downhill requires a large enough heat capacity and good convective heat exchange conditions. But in terms of the above two requirements, it is inevitable to occur the increase in the temperature of the brake. Therefore, at this time, the brake friction coefficient will be sharply reduced, which makes a rapid decrease in braking efficiency and thermal recession, and the above-mentioned phenomenon is more serious for the freight vehicle. In summary, monitoring the temperature of the brake is an important guarantee for the safety driving of the freight vehicle.

In a process of monitoring the temperature of the brake of the disclosure, m represents the weight of the freight vehicle, which needs to be determined by various parameters collected by the TBOX, and based on the data collected by the TBOX, a weight model is established as follows:

$$m(\delta a_x + a_\beta + f_m g) + \frac{1}{2}\rho C_d A_f v_x^2 = \frac{T_e n_e \eta_T}{v_x}. \tag{5}$$

In the formula (5), m represents the weight of the freight vehicle, $\delta$ represents the rotational mass coefficient of the freight vehicle, and a value of $\delta$ is an empirical value, $a_x$ represents the longitudinal acceleration of the freight vehicle, $a_\beta$ represents the equivalent acceleration value converted by the gradient resistance, $\beta$ represents the slope of the front road section, $f_m$ represents the rolling resistance coefficient of the freight vehicle, g represents the gravitational acceleration, $\rho$ represents the air density, $C_d$ represents the wind resistance coefficient, $A_f$ represents the windward area, $v_x$ represents the longitudinal speed of the freight vehicle, $T_e$ represents the output torque of the motor of the freight vehicle, $n_e$ represents the rotation speed of the motor of the freight vehicle, and $\eta_T$ represents the mechanical efficiency of the power transmission system of the freight vehicle. The m in the formula (5) is brought into the formula (4) to obtain real-time data of the freight vehicle collected by the TBOX to monitor real-time temperature of the front and rear wheels, as well as to collect the altitude variation of the front road section, thereby to predict the temperature variation of the brake of the freight vehicle. At the same time, the temperature warning threshold of the brake of the freight vehicle is set according to a temperature standard of the brake. When the real-time temperature, or the predicted temperature exceeds the temperature standard, the driver of the freight vehicle will be reminded to adjust the current driving strategy or give a specific change strategy, thus giving the real-time warning signal and the forewarning signal of the freight vehicle.

The data collected by the TBOX used in the disclosure, for example, (1) can obtain real-time information such as engine torque, speed, gear, speed, etc. of the freight vehicle, which can be combined with the theoretical model and parameters of the freight vehicle to determine the weight of the freight vehicle; and when the overall weight of the freight vehicle is obtained, it can be used as the data for monitoring the temperature of the brake of the freight vehicle.

(2) The high-precision map is embedded in the freight vehicle, which can not only obtain the position information of the freight vehicle, but also provide the longitudinal slope information of the current road, and the longitudinal slope information of the front road section. The current position information and the longitudinal slope information of the road section passed by some time ago can be used as the data for determining the current temperature of the brake of the freight vehicle; and the longitudinal slope information of the front road section can be used as the predictable information for determining the temperature of the brake of the freight vehicle in the front road section, thereby to generate the forewarning signal for the freight vehicle.

The monitoring method designed by the disclosure includes the following design concept.

In a first aspect, it is necessary to determine the weight of the freight vehicle and the weight of the freight vehicle is used as the input data for a temperature monitoring model of the brake of the freight vehicle.

In a second aspect, the map information and the position information have been obtained, so that the altitude variation of the freight vehicle in the front road section for the braking process can be calculated, thereby to calculate the current temperature of the brake of the freight vehicle; and when the current temperature of the brake of the freight vehicle is higher than the set temperature warning threshold, there is an emergency need to send the warning signal to remind the driver.

In a third aspect, according to the temperature monitoring method of the brake of the freight vehicle, the current temperature of the freight vehicle can be determined in real time, but there is a need to further propose a temperature predictability monitoring method. Predictability warning means that if the current temperature of the brake is at a high temperature (e.g. 300° C.), the speed of the freight vehicle is also high (e.g. 70 kilometer per hour (km/h)), and the longitudinal slope of the front road section is known in the map, therefore, the predictability warning should, on the one hand, remind the driver of the freight vehicle to slow down ahead before entering the front road section with a relative steep longitudinal slope, and on the other hand, if it is determined that the temperature of the brake disc of the freight vehicle will be too high on the front road section with a relative steep longitudinal slope, there is a need to send the forewarning signal to remind the driver to slow down or even stop in advance.

It should be noted that similar symbols and letters indicate similar items in the following attached drawings. Therefore, once an item is defined in one of the attached drawings, it need not be further defined and explained in the following drawings, and furthermore, the terms "first", "second", "third", etc. are used merely to describe distinctly and are not to be understood as indicating or implying relative importance.

It should be specific that the above embodiments are merely the illustrated embodiments of the disclosure to describe the technical solutions of the disclosure, not used to limit the disclosure, and the scope of the protection of the disclosure is not limited thereto. Although the disclosure is described in detail with reference to the embodiments, those skilled in the related art should understand that any one of those skilled in the related art can modify or readily conceive of changes to the technical solutions recorded in the above described embodiments within the scope of the protection of the disclosure, or make equivalent replacements to some of the technical features thereof. However, the modifications, changes or replacements do not make the essence of the corresponding technical solutions out of the spirit and scope of the technical solutions of the embodiments of the disclosure. All the above shall be covered within the scope of the protection of the disclosure. Therefore, the scope of the protection should be subject to the disclosure.

What is claimed is:
1. A temperature monitoring method of a brake of a freight vehicle based on a telematics box (TBOX), comprising:

determining a weight of the freight vehicle based on on-board diagnostic (OBD) data of the freight vehicle collected by the TBOX;

collecting an altitude of the freight vehicle and an altitude variation of a front road section, and determining a current temperature of the brake of the freight vehicle based on the weight of the freight vehicle, the OBD data of the freight vehicle, the altitude of the freight vehicle and the altitude variation of the front road section; and setting a temperature warning threshold of the brake based on performance parameters of the brake of the freight vehicle, and determining a first driving state of the freight vehicle and a second driving state of the freight vehicle in the front road section based on the temperature warning threshold and the current temperature of the brake;

wherein the first driving state indicates a driving state of the freight vehicle corresponding to the current temperature of the brake, and is configured to generate a warning signal of the freight vehicle; and wherein the second driving state indicates a driving state of the freight vehicle corresponding to a braking result of the freight vehicle caused by a temperature variation of the brake in the front road section, and is configured to generate a forewarning signal of the freight vehicle;

wherein the determining the temperature variation of the brake comprises:

determining a heat increasing amount based on a friction-generated heat amount of the brake, a convection heat dissipation amount and a radiation heat dissipation amount in a heat dissipation process of the brake to generate the temperature variation of the brake;

wherein the heat increasing amount is $$\Delta Q = Q_1 - Q_2 - Q_3,$$

where $Q_1$ represents the friction-generated heat amount of the brake, $Q_2$ represents the convection heat dissipation amount, and $Q_3$ represents the radiation heat dissipation amount;

wherein the friction-generated heat amount of the brake is determined based on the following formula:

$$Q_1(t) = \left\{\frac{1}{2}mv_0^2 - \frac{1}{2}mv(t)^2 + \int_{t_0}^{t} mgv(t) \times (i(t) - f)dt\right\} \times (1 - s(t)),$$

where m represents the weight of the freight vehicle, $v_0$ represents a speed of the freight vehicle at a moment $t_0$, v(t) represents a speed of the freight vehicle at a moment t, g represents a gravitational acceleration, i(t) represents a longitudinal slope of a road section at the moment t, f represents a rolling resistance coefficient of the freight vehicle, and s(t) represents a slip rate of wheels of the freight vehicle at the moment t during a braking process of the freight vehicle;

wherein the convection heat dissipation amount is determined based on the following formula:

$$Q_2(t) = h(t)A(T_w(t) - T_f(t)),$$

where h(t) represents a convective heat transfer coefficient and is determined based on a relevant empirical formula as follows:

$$h(t) = 1.05e^{v(t)/14.19} + 4.69;$$

wherein the radiation heat dissipation amount is determined based on the following formula:

$$Q_3(t) = \frac{1}{4}Q_2(t);$$

and wherein the temperature variation T(t) of the brake of the freight vehicle is determined based on the following formula:

$$T(t) = T_0 + \frac{\Delta Q}{Cm_a} = T_0 + \frac{Q_1 - Q_2 - Q_3}{Cm_a},$$

where C represents a specific heat capacity and a value of C is 470 Joules per kilogram degree Celsius (J/(kg·°C.)), and $m_a$ represents a mass of one of a brake disc and a brake drum of the freight vehicle.

2. The temperature monitoring method of the brake of the freight vehicle based on the TBOX according to claim 1, wherein the weight of the freight vehicle is expressed as:

$$m(\delta a_\chi + a_\beta + f_m g) + \frac{1}{2}\rho C_d A_f v_x^2 = \frac{T_e n_e \eta_T}{v_x},$$

where $\delta$ represents a rotational mass coefficient of the freight vehicle and a value of $\delta$ is an empirical value, $a_x$ represents a longitudinal acceleration of the freight vehicle, $a_\beta$ represents an equivalent acceleration value converted by a gradient resistance, $\beta$ represents a slope of the front road section, $f_m$ represents the rolling resistance coefficient of the freight vehicle, g represents the gravitational acceleration, $\rho$ represents an air density, $C_d$ represents a wind resistance coefficient, $A_f$ represents a windward area, $v_x$ represents a longitudinal speed of the freight vehicle, $T_e$ represents an output torque of a motor of the freight vehicle, $n_e$ represents a rotation speed of the motor of the freight vehicle, and $\eta_T$ represents a mechanical efficiency of a power transmission system of the freight vehicle.

3. The temperature monitoring method of the brake of the freight vehicle based on the TBOX according to claim 2, wherein the determining the first driving state of the freight vehicle based on the temperature warning threshold and the current temperature of the brake comprises:

determining the current temperature of the brake based on a work done by a friction of the brake of the freight vehicle, determining a temperature variation trend of the brake according to a current driving route trend of the freight vehicle, and generating the first driving state according to the current temperature of the brake, the temperature variation trend, and the temperature warning threshold.

4. The temperature monitoring method of the brake of the freight vehicle based on the TBOX according to claim 3, wherein the determining the second driving state of the freight vehicle based on the temperature warning threshold and the current temperature of the brake comprises:
- determining the altitude variation of the front road section and a driving trajectory variation of the freight vehicle based on a satellite navigation map; and
- determining, based on the altitude variation of the front road section and the current temperature of the brake, the second driving state in the front road section in a case that the freight vehicle remains in the first driving state.

5. The temperature monitoring method of the brake of the freight vehicle based on the TBOX according to claim 4, wherein during the determining the second driving state of the freight vehicle based on the temperature warning threshold and the current temperature of the brake, the temperature monitoring method further comprises:
- determining a third driving state of the freight vehicle in the front road section according to the first driving state, the driving trajectory variation of the freight vehicle and the altitude variation of the front road section; wherein the third driving state indicates a safe temperature of the brake under the altitude variation of the front road section and the driving trajectory variation of the freight vehicle; and
- adjusting the first driving state of the freight vehicle according to the third driving state of the freight vehicle.

6. The temperature monitoring method of the brake of the freight vehicle based on the TBOX according to claim 5, wherein the temperature monitoring method is implemented by a monitoring system, and the monitoring system comprises:
- a freight vehicle weight determination module, configured to determine the weight of the freight vehicle based on the OBD data of the freight vehicle collected by the TBOX;
- a brake temperature determination module, configured to collect the altitude of the freight vehicle and the altitude variation of the front road section, and determine the current temperature of the brake of the freight vehicle based on the weight of the freight vehicle, the OBD data of the freight vehicle, the altitude of the freight vehicle and the altitude variation of the front road section; and
- a freight vehicle monitoring module, configured to set the temperature warning threshold of the brake based on the performance parameters of the brake of the freight vehicle, and determine the first driving state of the freight vehicle and the second driving state of the freight vehicle in the front road section based on the temperature warning threshold and the current temperature of the brake;
- wherein the first driving state indicates the driving state of the freight vehicle corresponding to the current temperature of the brake, and is configured to generate the warning signal of the freight vehicle; and
- wherein the second driving state indicates the driving state of the freight vehicle corresponding to the braking result of the freight vehicle caused by the temperature variation of the brake in the front road section, and is configured to generate the forewarning signal of the freight vehicle.

7. The temperature monitoring method of the brake of the freight vehicle based on the TBOX according to claim 6, wherein the monitoring system further comprises:
- a data collecting module, configured to connect to the TBOX; and
- a display module, configured to display the first driving state, the second driving state, the third driving state, the warning signal, and the forewarning signal.

* * * * *